(12) United States Patent
Frisk

(10) Patent No.: US 7,771,555 B2
(45) Date of Patent: Aug. 10, 2010

(54) METHOD OF MANUFACTURING STRIP TAPE AND STRIP TAPE FOR CONTAINER

(75) Inventor: Peter Frisk, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 667 days.

(21) Appl. No.: 11/792,369

(22) PCT Filed: Dec. 7, 2005

(86) PCT No.: PCT/JP2005/022432

§ 371 (c)(1),
(2), (4) Date: Jun. 6, 2007

(87) PCT Pub. No.: WO2006/067963

PCT Pub. Date: Jun. 29, 2006

(65) Prior Publication Data

US 2007/0259152 A1 Nov. 8, 2007

(30) Foreign Application Priority Data

Dec. 24, 2004 (JP) .............................. 2004-374700

(51) Int. Cl.
*B32B 37/02* (2006.01)
*B32B 37/12* (2006.01)
*B32B 38/04* (2006.01)
*B32B 27/32* (2006.01)
*B32B 27/36* (2006.01)
*B32B 27/30* (2006.01)

(52) U.S. Cl. .............. 156/253; 156/250; 156/252; 156/254; 156/269; 156/271; 428/34.3; 428/35.2; 428/35.4; 428/141; 428/142; 428/152; 428/347; 428/354

(58) Field of Classification Search .............. 156/250, 156/252–254, 269–271; 428/34.3, 35.2, 428/35.4, 141, 142, 152, 155, 347, 354
See application file for complete search history.

(56) References Cited

U.S. PATENT DOCUMENTS 4,160,335 A * 7/1979 Von Kohorn et al. .......... 43/131

(Continued)

FOREIGN PATENT DOCUMENTS

JP 2000-212528 A 8/2000

(Continued)

OTHER PUBLICATIONS

International Search Report dated Mar. 20, 2006.

*Primary Examiner*—Mark A Osele
*Assistant Examiner*—Christopher C Caillouet
(74) *Attorney, Agent, or Firm*—Buchanan Ingersoll & Rooney PC

(57) ABSTRACT

Disclosed is a method for manufacturing a low-cost tape having excellent gas-barrier properties which is suitable as a strip tape for liquid food containers. Also disclosed is such a tape. Specifically disclosed is a strip tape including an intermediate layer composed of a drawn polyester film, a band-like coating film of an ethylene-vinyl alcohol copolymer which is formed on a surface of the intermediate layer in the central zone of the strip tape in the transverse direction, non-coated bands formed on both sides of the coating film, and heat-sealing outermost layers composed of a low-density polyethylene or the like.

2 Claims, 1 Drawing Sheet

U.S. PATENT DOCUMENTS

| | | | |
|---|---|---|---|
| 5,413,845 A * | 5/1995 | Lofgren et al. | 428/215 |
| 6,974,612 B1 * | 12/2005 | Frisk et al. | 428/34.2 |
| 2003/0235700 A1 | 12/2003 | Frisk et al. | |
| 2004/0253463 A1 | 12/2004 | Inui et al. | |

FOREIGN PATENT DOCUMENTS

| | | |
|---|---|---|
| JP | 2001-354916 A | 12/2001 |
| JP | 2003-191383 A | 7/2003 |
| JP | 2004-001417 A | 1/2004 |
| JP | 2004-211040 A | 7/2004 |
| JP | 2004-315781 A | 11/2004 |

\* cited by examiner

METHOD OF MANUFACTURING STRIP TAPE AND STRIP TAPE FOR CONTAINER

BACKGROUND OF THE INVENTION

1. Technical Field

The present invention relates to a method of manufacturing a strip tape for forming a container in which a liquid food such as juice or milk is filled in, and to a strip tape for a container.

2. Background Art

Packaging containers for drinks and fluid food such as milk, juice, and mineral water are obtained from packaging laminated materials such as a web-formed packaging material made from a laminated body of a fibrous base material (such as paper) and a thermoplastic material layer with a decorative design printed thereon and also a crease provided thereon. A strip tape for protection of a container wall edge surface in a sealed section, in which container walls of the container are overlaid on each other, is adhered on an inner side edge portion of the web-formed packaging laminated material, the web-formed packaging laminated material is formed into a tubular form by sealing the web-formed packaging laminated material with a strip tape in the longitudinal direction, a food is filled in the tubular-formed packaging material, the tubular-formed material is sealed in the lateral direction and is formed into pillow-like primary formations, the pillow-like formations are cut into independent pieces, and then the pillow-like formation is folded along a crease to be formed into the final form. The final form includes, a brick-like form, an octangular column, a regular tetrahedron, and the like.

Figure 2:
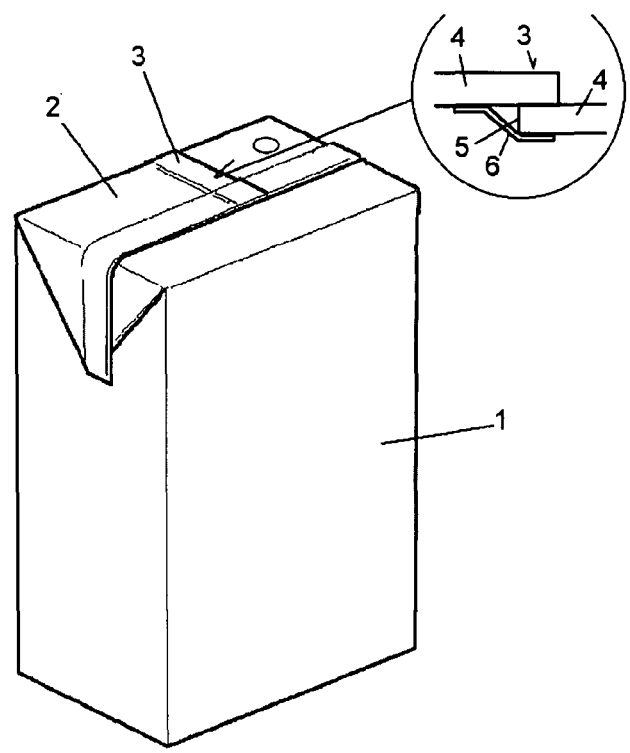

FIG. 2 is a perspective view illustrating an example of a container with a partial cross-section shown in the enlarged state.

In this container 1, on a rear side face of the container (not shown) and a bottom surface of the container (not shown), a vertical seal section 3, in which wall surfaces of the container are overlaid on each other, is formed.

In the vertical seal section 3, packaging materials 4 are overlaid on each other to form a seal as shown in the partial enlarged cross-sectional view. On an inner end face 5 of the vertical seal section 3, both edge portions of a strip tape 6 are adhered to the packaging materials respectively to form a seal covering the end faces 5.

When a fluid food is filled in the container, there is the possibility that a liquid-permeable fibrous material layer of the packaging material such as paper is exposed from the end face and the liquid comes into inside of the container, but since the edge faces are covered with a water-proof strip tale 6, so that it is possible to prevent the liquid from coming into the container. The strip tape is generally made of thermoplastic resin such as low density polyethylene or the like (Refer to Patent document 1).

When the barrier properties is required for a container, the strip tape has a barrier layer in addition to inner and outer layers made of thermoplastic resin such as low density polyethylene.

Materials, which can be used to form the barrier layer, includes, but not limited to, polyester film, ethylene-vinyl alcohol copolymer (EVOH), polychloride vinyliden (PVDC), polyvinyl alcohol (PVA), MXD (methylxylene diamine), aluminum foil, aluminum-deposited film, and transparent deposited film prepared by depositing, in place of aluminum, vapor of $(SiO_x)$ or alumina $(Al_2O_3)$.

Patent document 1: Japanese Patent Laid-Open Publication No. 2001-354916

DISCLOSURE OF THE INVENTION

Problems to be Solved by the Invention

In the conventional technology described above, for instance, the EVOH shows excellent barrier properties, but the resistance against humidity is low, and the capability as a barrier easily be deteriorated, and also the cost is high. On the other hand, although the polyester film is low in the capability as a barrier, but has excellent mechanical strength and high resistance against water, and in addition the cost is low. AS described above, there is no material well adapted to production of a strip tape for a liquid food container in the prior art.

An object of the present invention is to provide a method of manufacturing a low cost tape excellent in the capability as a gas barrier, well adapted to production of a strip tape for a liquid food container, and capable of functioning as a laminated strip tape for protection of an end face of the container wall in a seal section in which wall surfaces of the container are overlaid on each other, namely a tape which has the waterproof property and mechanical strength as a whole and also has the heat-sealing property in a seal section in which container wall surfaces are overlaid on each other, and also has the capability functioning as a gas barrier in a section where the tape covers the end face of the container wall, and in addition which can protect materials in a layer inside the strip tape from influences by external moisture or the atmospheric air.

Means for Solving the Problems

The method of manufacturing a strip tape capable of solving the problems as described above according to the present invention can be used for manufacturing a laminated strip tape for protecting end faces of a container wall in a seal-section in which wall surfaces of the container are overlaid on each other, and the method includes the steps of:

(a) preparing a web-formed oriented polyester film;

(b) applying a liquid containing ethylene-vinyl alcohol copolymer on a surface of the oriented polyester film being carrier, with a constant width and with a constant pitch in the band-like state to form a plurality of band-like coating films made of ethylene-vinyl alcohol copolymer and a plurality of not-coated zones;

(c) laminating a thermo-sealable polyolefin layer via a adhesion layer on each of the both surface of the oriented polyester film; and (d) cutting the obtained laminated film substantially along a center line of each of the not-coated zones to obtain a plurality of strip tapes.

In a preferable embodiment of the present invention, the liquid containing ethylene-vinyl alcohol copolymer comprises an aqueous medium, a hydrophilic ethylene-vinyl alcohol copolymer distributed in the aqueous medium, and fine laminated silicate.

The strip tape for a container according to the present invention is a laminated strip tape for protection of end faces of a container wall in a seal section in which wall surface of the container are overlaid on each other, and the strip tape comprises:

an intermediate layer comprising a oriented polyester film;

a band-like coating film made of a ethylene-vinyl alcohol copolymer formed in a central zone of the strip tape applied on a surface of the intermediate layer in the lateral direction and not-coated zones formed in both sides of the coating film zone; and a heat-sealable outermost layer comprising heat-sealable polyolefin and formed in both sides of the strip tape.

In a preferable embodiment of the present invention, the band-like coating film made of ethylene-vinyl alcohol copolymer comprises a hydrophilic ethylene-vinyl alcohol copolymer remaining after the aqueous medium is evaporated from the liquid containing the ethylene-vinyl alcohol copolymer, and a fine laminated silicate homogeneously distributed in the ethylene-vinyl alcohol copolymer.

Effect of the Invention

With the present invention as described above, advantageous effects are provided by the actions and operations as described below.

Namely, the intermediate layer comprising a oriented polyester film in the strip tape for a container according to the present invention provides the heat resistance and the mechanical strength to the entire strip tape, enables preservation of a tape form during a production process in heated atmosphere, and also gives the gas-barrier properties.

The band-like coating film made of ethylene-vinyl alcohol copolymer applied on a surface of the intermediate layer is formed on a central zone of the strip tape in the lateral direction, and therefore a section requiring the gas-barrier properties formed when end portions of the container walls are overlaid on each other is sufficiently protected from gas.

The not-coated zones formed in both sides of the coating film are held between two-layered heat-sealable outermost layers each made of waterproof and heat-sealable polyolefin, so that moisture or other materials are proved prevented from coming into inside of the tape, which is useful for protection of the band-like coating film made of ethylene-vinyl alcohol copolymer which is weak against moisture. In addition, it is not necessary to use the ethylene-vinyl alcohol copolymer, a quantity of ethylene-vinyl alcohol copolymer used in production of the tape can be reduced, which enables production of a low-cost strip tape.

The heat-sealable outermost layer made of here polyolefin gives the waterproof property to the entire tape, and also gives the heat-sealable property in a seal section where container wall surfaces are overlaid on each other.

Namely, the heat-sealable outermost layer enables production of a strip tape for a liquid food container which have the waterproof property and the mechanical strength as a whole and is excellent in the heat-sealability as well as in the selective gas-barrier properties and can protect barrier materials from moisture.

In the method of manufacturing the strip tape, a liquid containing ethylene-vinyl alcohol copolymer is applied to form coating film zones and not-coated zones, and therefore dimensions of the strip tape can easily be changed by adjusting a width of the coating film and a clearance between the coating film zones.

Furthermore, a thickness of coating film can easily be adjusted by controlling an application rate, so that the gas-barrier properties can easily be enhanced or lowered.

BEST MODE FOR CARRYING OUT THE INVENTION

An embodiment of the present invention is described in detail below with reference to the drawings.

Figure 1:
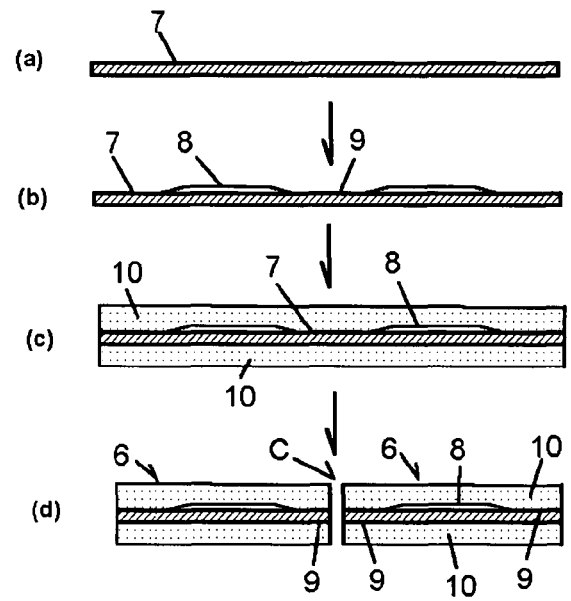

FIG. 1 is a cross-sectional view schematically illustrating steps in a method of manufacturing a strip tape according to an embodiment of the present invention.

In the method of manufacturing a strip tape according to this embodiment, a laminated strip tape 6 is produced for protecting end faces of container walls in a seal section in which the container walls are overlaid on each other.

In step (a), a web-form oriented polyester film 7 is prepared (Refer to FIG. 1(a)).

In this invention, the polyester film is a one-axial or a two-axial oriented film. According to an application and the required characteristics of the strip tape, specifications, a thickness and other dimensions of the polyester film can easily be selected or changed.

In step (b), the oriented polyester film is carried, and as shown in FIG. 1(b), a liquid containing ethylene-vinyl alcohol copolymer is applied in a strip form with a constant width and at a constant pitch on a surface of the oriented polyester film 7 to form two ethylene-vinyl alcohol copolymer strip coating films 8 and not-coated zones 9.

In this invention, the liquid containing ethylene-vinyl alcohol copolymer is a fluid containing EVOH, and the medium can easily be evaporated from the coating film. The medium is classified to an aqueous medium and a solvent-based medium, and an aqueous medium is preferable in the present invention.

A width of a coating film and a pitch between the coating films (namely a length two times longer than a width of a not-coated zone) can easily be changed according to required dimensions of the strip tape. For instance, when a width of the strip tape is 7.5 mm, a width of the coating film is in the range from 4 to 5 mm, wile the pitch is in the range from 3.5 to 1.5 mm.

In a preferable embodiment of the present invention, the liquid containing ethylene-vinyl alcohol copolymer comprises an aqueous medium, a hydrophilic ethylene-vinyl alcohol copolymer dispersed in the aqueous medium, and film laminated silicate homogeneously dispersed in the ethylene-vinyl alcohol copolymer.

The aqueous medium is water or alcohol. The alcohol includes, but not limited to methanol, ethanol, isopropanol, and butanol. Isopropanol is preferable in the present invention.

As for contents of components in the liquid containing ethylene-vinyl alcohol copolymer, for instance, a content of water is in the range from 50 to 70% by weight, a content of alcohol is in the range from 30 to 40% by weight, and a content of EVOH is in the range from 1 to 8% by weight. The contents can freely be changed according to the necessity.

In a preferable embodiment of the present invention, the liquid containing ethylene-vinyl alcohol copolymer contains minute laminated silicate which is homogeneously dispersed.

Preferably the layer silicate with the particle diameter in the range from 1 to 80 microns and not including those with the diameter of 300 microns or more is dispersed in the ethylene-vinyl alcohol copolymer by 0.01 to 5% by weight, and the laminated silicate is dispersed substantially homogeneously with the inter-layer distance of 50 Angstroms.

A raw material for the laminated silicate as described above is, for instance, a laminated silicate phyllo-ciliate comprising a layer of magnesium silicate or aluminum silicate. A quantity of the laminated silicate blended therein is in the range from 0.01 to 5% by weight against the polymer, and more preferably in the range from 0.05 to 2% by weight.

In step (c), a seat-sealable polyolefin layer 10 is laminated via a adhesion layer (not shown) or directly on both surfaces of the oriented polyester film 7 on which the coating film 8 is formed.

As a method of laminating the seat-sealable polyolefin layer 10, there is a method in which, for instance, a melted low-density polyethylene is extruded and laminated in batch or by and by onto both surfaces of the oriented polyester, or a method in which the seat-sealable polyolefin film is dry-laminated onto both surfaces of the strength polyester film.

The heat-sealable polyolefin, which can be used in this invention, includes low-density polyethylene produced by the high pressure method, linear low-density polyethylene, linear low-density polyethylene produced with metallocene catalyst, intermediate-density polyethylene, polypropylene, and copolymers of the materials.

The adhesive used in the step includes adhesive resin or an anchor-coat agent.

In step (d), the obtained laminated film is cut into two strip tapes 6, 6 along a substantially central line C of the not-coated zone 9.

In this embodiment, two strip tapes can be produced, but the number of strip tapes produced as described above is not limited to two, and for instance, 10 coating films can be formed for manufacturing 10 strip tapes.

The strip tape obtained in this embodiment includes, as shown in FIG. 1(*d*), an intermediate layer 7 comprising a oriented polyester film, an ethylene-vinyl alcohol copolymer band-like coating film 8 made of an ethylene-vinyl alcohol copolymer applied on a surface of the intermediate layer 7 and formed in a central zone in the lateral direction of the strip tape, not-coated zones 9,9 formed in both sides of the coating film 8, and heat-sealable outermost layers 10, 10.

In a preferable embodiment, a band-like coating film made of an ethylene vinyl alcohol copolymer is prepared by evaporating an aqueous medium form a liquid containing an ethylene vinyl alcohol copolymer, and therefore comprises a film in which dispersed particles of the hydrophilic ethylene vinyl alcohol copolymer are crushed and overlaid on each other, and a minute laminated silicate homogeneously dispersed in the ethylene vinyl alcohol copolymer.

EXAMPLES

Example 1

A web-formed two-axial oriented polyester film with a width of 15 mm is prepared.

Then a liquid containing an ethylene vinyl alcohol copolymer is prepared.

The ethylene vinyl alcohol copolymer contains a laminated silicate particles with the average diameter of 50 micros and not including those with the diameter of 300 micros by 1% by weight, and the laminated silicate is dispersed in substantially homogeneously with the inter-layer distance of 50 Angstroms or more.

The ethylene vinyl alcohol copolymer containing minute laminated silicate homogeneously dispersed by 2% by weight, water by 60% by weight, and isopropanol by 38% by weight are mixed with each other, and the resultant mixture solution was agitated in a vessel to prepare a dispersion.

While the oriented polyester film is being carried, the liquid containing the ethylene vinyl alcohol copolymer is applied on a surface of the oriented polyester film to form two coating films each having a width of 4 mm with a pitch of about 2 mm.

A gas for drying is flown over the coating films to dry the coating films.

Low-density polyethylene is extruded together with adhesive resin onto and laminated on both surfaces of the oriented polyester film with the coating films formed thereon to obtained a strip tape. The tape is cut along the center line to obtain two strips of strip tapes.

Using the strip tape prepared as described above, the container shown in FIG. 2 is formed, and the carrier capability is measured. The strip tape has the excellent barrier capability.

Example 2

A web-formed two-axial oriented polyester film with a width of 30 mm is prepared, and a liquid containing an ethylene vinyl alcohol copolymer is applied on a surface of the oriented polyester film to form four coating films each having a width of 4 mm with a pitch of about 2 mm. With the same operations as those in Example 1, a strip tape is obtained and a container is formed with the strip tape. Then the carrier capability is measured. The container has the excellent barrier capability.

A strip tape is obtained like in Example 1 excluding the point that the ethylene vinyl alcohol copolymer by 4% by weight, water by 60% by weight, and isopropanol by 36% by weight are mixed with each other to prepare dispersion. Then a container is prepared with the strip tape, and the barrier capability is measured. The barrier capability is excellent.

Comparative Example

A strip tape is obtained like in Example 1 excluding the point that a liquid containing an ethylene vinyl alcohol copolymer is applied on a surface of the oriented polyester film to form a coating film with not clearance and a strip tape with the ethylene vinyl alcohol copolymer exposed on an end face thereof. A container is prepared with the strip tape, and the carrier capability is measured. It is observed that the barrier capability of the strip tape is deteriorated due to the moisture-absorption characteristics.

The present invention is not limited to the embodiments described above, and can be modified and changed within the gist of the present invention. The modifications and changes are included within a scope of the present invention.

INDUSTRIAL APPLICABILITY

The method of manufacturing a strip tape and the strip tape for a container according to the present invention can be used for packaging and filling liquid foods such as juice or milk in paper containers.

DETAILED DESCRIPTION OF THE EMBODIMENTS

FIG. 1 is a cross-sectional view schematically illustrating steps in a method of manufacturing a strip tape according to an embodiment of the present invention; and FIG. 2 is a perspective view of a container with an enlarged cross-sectional view illustrating a portion of the container.

DESCRIPTION SIGNS

1. Container
2. Strip tape
7. Intermediate layer
8. Coating film

What is claimed is:

1. A method of manufacturing a laminated strip tape for protection of end faces of container walls in a seal section in which walls of the container are overlaid on each other, the method comprising:

(a) preparing a web-formed oriented polyester film;
(b) applying a liquid containing ethylene-vinyl alcohol copolymer on a surface of the oriented polyester film being carrier, with a constant width and with a constant pitch in the band-like state to form a plurality of band-like coating films made of ethylene-vinyl alcohol copolymer and a plurality of not-coated zones;
(c) laminating a thermo-sealable polyolefin layer via a adhesion layer on each of the both surface of the oriented polyester film; and
(d) cutting the obtained laminated film substantially along a center line of each of the not-coated zones to obtain a plurality of strip tapes.

2. The method of manufacturing a strip tape according to claim 1, wherein the liquid containing a ethylene vinyl alcohol copolymer comprises an aqueous medium, a hydrophilic ethylene vinyl alcohol copolymer dispersed in the aqueous medium, and a minute layered silicate homogeneously dispersed in the ethylene vinyl alcohol copolymer.

* * * * *